United States Patent
Pieterse et al.

[11] Patent Number: 6,061,664
[45] Date of Patent: May 9, 2000

[54] SYSTEM FOR FACILITATING THE ORDERING AND PAYING OF SERVICES BY MEANS OF A COMMUNICATION NETWORK

[75] Inventors: Rob Pieterse, Aerdenhout; Mark Albert Pors, Zoetermeer; Jaap Rudolf De Beurs, Hengelo; Frank Pieter Van Pomeren, Delft, all of Netherlands

[73] Assignee: Koninklijke PTT Nederland N.V., Netherlands

[21] Appl. No.: 08/731,081

[22] Filed: Oct. 9, 1996

Related U.S. Application Data

[63] Continuation-in-part of application No. 08/639,243, Apr. 22, 1996, Pat. No. 5,701,450.

[30] Foreign Application Priority Data

Oct. 10, 1995 [NL] Netherlands ............................ 1001387
Apr. 26, 1996 [WO] WIPO ....................... PCT/EP96/01739

[51] Int. Cl.[7] .................................................. H04M 11/00
[52] U.S. Cl. .................................. 705/39; 902/29; 902/40
[58] Field of Search ............................. 705/1, 5, 17, 26, 705/27, 42; 202/4, 24, 26, 40, 39; 235/379, 380; 704/270, 273, 275; 379/91.01, 91.02, 93.12, 93.14, 196, 197, 242, 258, 272

[56] References Cited

U.S. PATENT DOCUMENTS 5,136,632  8/1992  Bernard .
5,189,287  2/1993  Parienti .
5,359,182  10/1994  Schilling .
5,396,558  3/1995  Ishiguro et al. .
5,495,098  2/1996  Pailles et al. ........................ 235/380 X
5,521,966  5/1996  Friedes et al. ............................ 379/91

FOREIGN PATENT DOCUMENTS 0 451 057    10/1991   European Pat. Off. .
0 590 861     4/1994   European Pat. Off. .
0 618 539    10/1994   European Pat. Off. .
0 658 862     6/1995   European Pat. Off. .
62-043943     2/1987   Japan .
2 211 050     6/1989   United Kingdom .
2 258 749     2/1993   United Kingdom .
WO 88/03294   5/1988   WIPO .
WO 91/07042   5/1991   WIPO .
WO 92/21110  11/1992   WIPO .
WO 95/04328  11/1992   WIPO .

*Primary Examiner*—Melanie A. Kemper
*Attorney, Agent, or Firm*—Michaelson & Wallace; Peter L. Michaelson

[57] ABSTRACT

The invention relates to a system (1) for electronic orders and payments by means of a communication network (6), such as a telephone network. A facilitating unit (2) comprising a voice response system (21) and a communication server (22) makes it possible, with the aid of simple subscriber equipment (8, 10) and a smart card (9), to order services and to effect electronic payments. The facilitating unit (2) is designed so as to be readily scalable and expandable. Preferably, it is also possible to revalue a smart card (9) by way of the system (1) of the invention.

20 Claims, 5 Drawing Sheets

| Type | Item | | Free/Used |
|---|---|---|---|
| Process | Revalue 1 | | F |
| | ⋮ | | ⋮ |
| | Revalue n | | F |
| | Devalue 1 | | U |
| | ⋮ | | ⋮ |
| | Devalue 5 | | U |
| | ⋮ | | ⋮ |
| | Devalue m | | F |
| | Other 1 | | F |
| | ⋮ | | ⋮ |
| | Other p | | F |
| Transaction | Unit A | SM 1 | U |
| | | SM 2 | F |
| | | SM 3 | F |
| | Unit B | SM 1 | F |
| | | SM 2 | U |
| | | SM 3 | F |
| Revaluation | Unit A | 1 | F |
| | | 2 | U |
| | | 3 | F |
| | Unit B | 1 | F |
| | | 2 | F |
| | | 3 | F |
| Expansion | Unit A | | F |
| | Unit B | | F |
| Modem | Unit A | | F |
| | Unit B | | U |

# 6,061,664

SYSTEM FOR FACILITATING THE ORDERING AND PAYING OF SERVICES BY MEANS OF A COMMUNICATION NETWORK

CROSS-REFERENCE TO RELATED APPLICATION

This application is a continuation-in-part of U.S. patent application "Device for Transparent Interaction Between an IC Card and a Remote Terminal", Ser. No. 08/639,243, filed Apr. 22, 1996, now U.S. Pat. No. 5,701,450.

BACKGROUND OF THE INVENTION

1. Field of the Invention

The invention relates to a system for remote electronic transactions, which system comprises a telecommunication network, such as a telephone network. The invention specifically relates to a system for providing electronic services, including financial transactions and identifications, and in which use is made of electronic payment means, such as so-called "smart cards" or "IC cards", and a communication network for transmitting payment data.

2. Description of the Prior Art

Remote ordering with the aid of, e.g., a telephone is known per se. It is possible, e.g., by telephone to order items from a mail-order firm. In this connection, however, the payment must take place later, upon delivery. This is experienced, both by the service provider (the mail-order firm) and the consumer (the ordering customer), as inconvenient, definitely in the event that the customer orders for someone else.

Systems for electronic payment are also known per se. It is known, e.g., to carry out, with the aid of a remote computer (PC), financial transactions ("telebanking"). In this connection, the computer of the customer is used as an aid for giving commands to the computer of the payment institution. The computer of the customer may also be used for identifying the user by means of, e.g., a PIN (Personal Identification Number).

Furthermore, it is known to use card-shaped electronic payment means to pay electronically. Thus, telephone booths nowadays are usually equipped for paying by means of an electronic payment card. It should be noted that in this text the term "smart card" or "IC card" will be used to indicate electronic payment means comprising an integrated circuit having at least a memory, but preferably also a processor. Such electronic payment means, which usually are constituted by a card in which the integrated circuit is embedded, enable in most cases the storage of a balance representing a value (so-called "prepaid cards"), and often also allow an identification of the user. It should, however, be understood that payment cards having a magnetic strip for storing a balance and/or identification data (so-called magnetic stripe cards) are for many applications equivalent to smart cards.

Existing systems for electronic payments make it possible to pay for certain services during use, e.g., in the event of the public telephone booth mentioned above, which may be activated by means of a card. It is often not possible, however, to securely pay for a number of different services in advance with the aid of an IC card and a telephone set. Moreover, in existing systems the option is lacking of revaluing the IC card in a remote manner, i.e., at the customer's premises. Furthermore, prior art systems do not allow an easy expansion of the systems as the demand for remote transactions increases.

International patent application WO 94/11849, for example, discloses a system for effecting payments with the aid of mobile telephony (GSM). In the known system, the rights of the user are checked with the aid of the user card (SIM) and an identification code which is checked locally. The known system offers no provisions for applying payment cards such as so-called "prepaid cards".

International Patent Application WO92/21110 discloses a system for the acquisition of services using a telephone set equipped with a smart card reader. The smart card is used to identify the user. This known system provides a coupling between the smart card of a user and the computer of a service provider, but does not comprise a specialized system for facilitating remote transactions. Also, this prior art system does not comprise means that enables a shortened transaction time.

European Patent Application EP 0 590 861 discloses a method for credit or debit card authorization. An authorization code is given to a vendor if a card holder is authorized to incur the expense of a purchase. The vendor then charges the credit card company for the purchase using the authorization code. This prior art method does not offer the possibility of direct payment. The use of smart cards is not disclosed.

European Patent Application EP 0 618 539 discloses a method for providing service using credit cards via a telephone network. There is no direct debiting or crediting of smart cards.

European Patent Application EP 0 658 862 discloses a method and system for mediating transactions using smart cards. A smart card gateway serves as a mediator between the user and a service provider to obtain credit information. A credit bureau host is used to validate credit information. Smart cards are used in this prior art system for identification purposes only. There is no disclosure of direct payment by means of smart cards.

European Patent Application EP 0,588,339 and corresponding U.S. Pat. No. 5,396,558 disclose a method and apparatus for the settlement of accounts by means of IC cards. The method uses secret and public keys and digital signatures to protect the card data and to enable a direct exchange of data between card terminals. There is no disclosure of a system in which payment data are stored at a trusted third party.

The above-mentioned prior art documents are herewith incorporated by reference in this text.

SUMMARY OF THE INVENTION

It is an object of the invention to eliminate the above-mentioned and other drawbacks of the prior art, and to provide a system which makes it possible to remotely pay for a plurality of different services with the aid of an electronic payment means, such as a smart card. It is also an object of the invention to provide a system which makes it possible, in a simple but reliable manner to remotely process electronic payments. It is a further object of the invention to provide a system which makes use of existing telecommunication means such as, e.g., the public telephone network. It is an additional object of the invention to provide a system which offers the option of revaluing remote smart cards. It is a yet further object of the invention to provide a system which offers the option of remote revaluation of a smart card and/or remote identification. It is a still further object of the present invention to provide a system for remote transactions which is scalable and readily expandable.

To this end, the present invention provides a system for electronic remote services, such as financial services, comprising a communication network, a facilitating unit coupled with both the network and one or more support units, a terminal coupled to the communication network, a service unit coupled to the communication network, the terminal being provided with means for exchanging information with a payment means.

The facilitating unit for enabling services by providing communication routes between a user terminal, a service unit and support units, preferably comprises a voice response system and a communication server mutually connected by a control link and a data link, the voice response unit being arranged for handling a service request and passing the request to the communication server via the control link, the communication server being arranged for setting up, in response to the service request, a communication route from the voice response system via the data link and the communication server to a support unit.

With the aid of such a system, it is possible for a user, by way of his terminal and the communication network, to establish a direct communication route with the facilitating unit, after which the facilitating unit contacts the service unit of a service provider and the transaction unit of the system respectively. In this manner, a service may be ordered and, by way of the transaction unit in combination with the smart card, be paid directly and in a remote manner. Moreover, it is possible with such a system to remotely revalue smart cards in the event that the system is also provided with a revaluation unit coupled to the facilitating unit. Furthermore, it is possible to identify a card user if the system is also provided with an identification unit coupled to the facilitating unit.

BRIEF DESCRIPTION OF THE DRAWINGS

The invention will be further explained below with reference to the drawings, in which.

EXEMPLARY EMBODIMENTS

Figure 1:
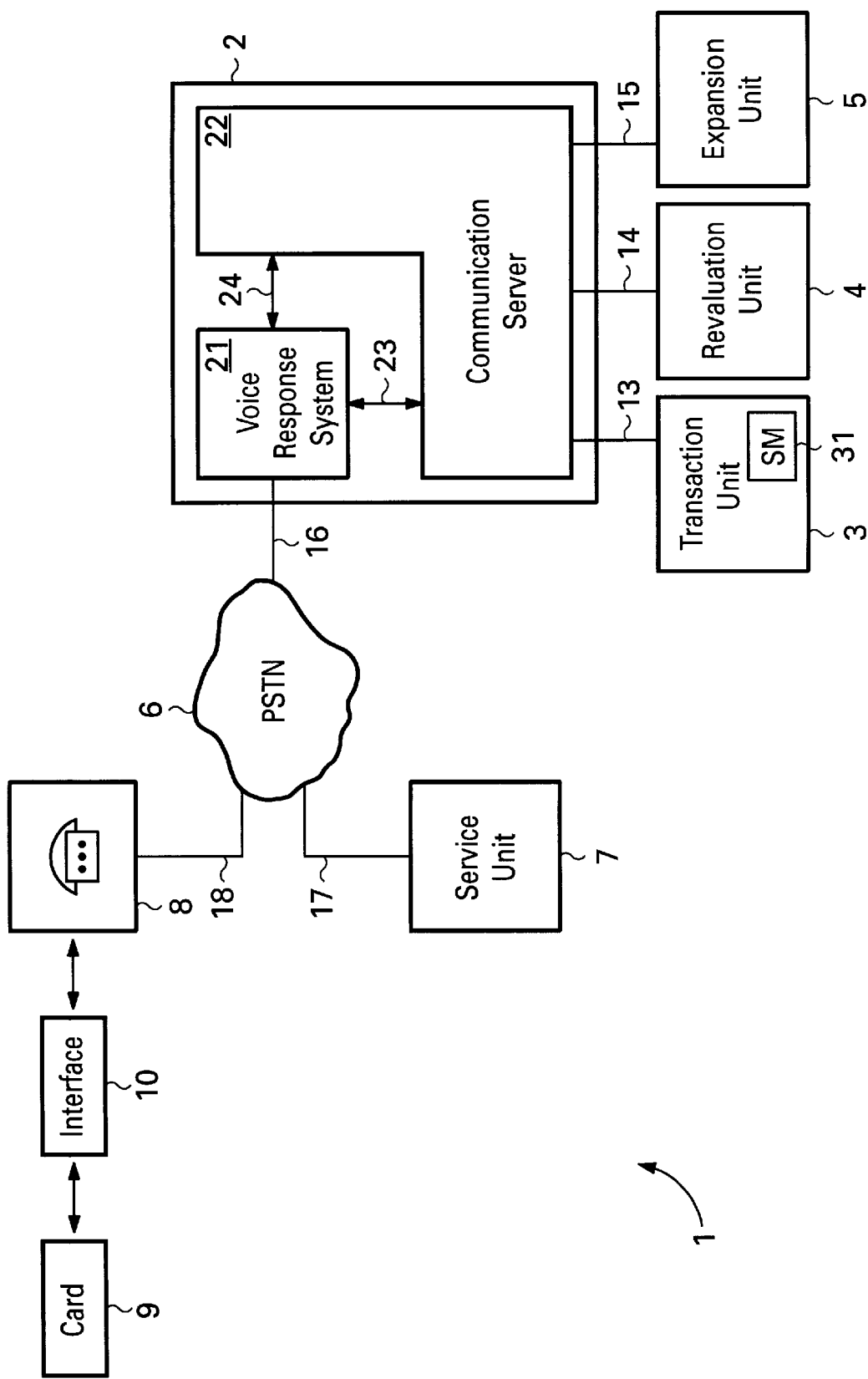
FIG. 1 diagrammatically shows an embodiment of a system according to the invention for electronically carrying out financial transactions and ordering services, FIG. 2 diagrammatically shows the facilitating unit and associated parts of the system of FIG. 1, FIG. 3 diagrammatically shows the processes of the facilitating unit of FIG. 2, FIG. 4 diagrammatically shows an example of a resource table as used in the facilitating unit of FIGS. 2 and 3, FIG. 5 diagrammatically shows the exchange of messages between the constituent parts of a remote payment system in accordance with the invention.

The system 1 shown in FIG. 1, by way of example, comprises a facilitating unit 2 coupled with three support units, i.e. a transaction unit 3, a revaluation unit 4 and an expansion unit 5, by means of communication links 13, 14 and 15 respectively. The facilitating unit 2 is connected with a communication network 6 via a communication link 16. A service unit 7 and a terminal 8 are connected with the communication network 6 by means of communication links 17 and 18 respectively. It will be understood that in practice a plurality of terminals 8 and service units 7 may be coupled to the communication network 6 by means of a plurality of parallel communication links 17 and 18 respectively.

The communication network 6, which provides the communication between a consumer (via a terminal 8), a service provider (via a service unit 7) and the transaction, revaluation and expansion units 3, 4 and 5 respectively (via the facilitating unit 2), is preferably constituted by a fixed public switched telephone network (PSTN). It will be understood, however, that the communication network 6 may just as well comprise a mobile communication network, such as e.g. a GSM or DECT network, or another fixed communication network, such as an ISDN network. In the example shown, the communication links 16 through 18, and also communication link 24, are telephone lines.

The terminal 8 of a consumer (user) may be constituted by an ordinary telephone set, but possibly also by a mobile telephone, an ISDN set or, possibly, a fax machine. The terminal 8 is provided with (internal or external) interface means 10 for exchanging data with an electronic payment means 9, such as a smart card, provided with an integrated circuit for storing and processing payment and/or identification data. A terminal 8 may be used which is especially equipped for carrying out electronic payment transactions and which, to this end, comprises a smart card reader/writer. An ordinary telephone set, however, may be advantageously applied in combination with a device as described in International Patent Application PCT/EP96/01739 and corresponding U.S. patent application Ser. No. 08/638,243, herewith incorporated by reference in this text. Such a device (acting as interface means 10) provides a transparent interface between a smart card and a telephone set, converting electrical smart card signals into acoustical ones and vice versa without altering the transferred data proper. The transparent interface provides a transparent path between the smart card and (the security module of) a transaction unit, as will later be explained in more detail. A suitable interface 10 may also be connected in the communication link 18 and thus be electrically connected with the terminal 8.

The service unit 7 preferably comprises a speech generating response unit ("voice response system"), which may be controlled by DTMF tones generated by either the user's terminal or by the response unit itself. The service provider's response unit may be constituted by a suitably programmed computer. The service unit 7, however, may also consist of a further terminal, such as a telephone set, and a data processing device, such as a personal computer which is controlled by a human operator. The service unit 7 may be equipped for rendering services at a charge, such as, e.g., delivering foods or booking transportation, but also financial services such as remitting money. Although the service unit 7 is shown to be connected with the facilitating unit 2 through the network 6, alternative embodiments may be envisaged in which a service unit 7 is coupled directly with the voice response system 21 of the facilitating unit 2.

In the example shown, the facilitating unit 2 facilitates services by providing a (preferably transparent) intermediary between: (a) the terminal 8 and the smart card 9 of a consumer, (b) the service unit 7 of a service provider, and (c) the transaction unit 3 which enables the payment of services offered. Additionally, the facilitating unit 2 can act as a (preferably transparant) intermediary between e.g. a smart card 9 of a consumer and a revaluation unit 4 in order to provide financial services.

The facilitating unit 2 consists of at least one voice response system 21 and at least one communication server 22. These two constituent components of the facilitating unit 2 are mutually connected by means of a control link 23 and a data link 24. As will be explained later in more detail, the control link 23 and the data link 24 may comprise a communication network (e.g. PSTN, ISDN or X.25). The transaction unit 3, the revaluation unit 4 and the expansion unit 5 are connected with the communication server 22 of the facilitating unit 2 through communication links 13, 14 and 15 respectively. The communication links 13, 14 and 15 may be transmission lines, but may also comprise suitable networks.

The system of FIG. 1 may be applied as follows (it will be assumed that the terminal 8 is an ordinary telephone set and that the consumer in question disposes of an interface or transfer device 10 according to International Patent Application PCT/EP96/01739 for coupling the smart card 9 and the telephone set 8). The consumer uses the terminal (telephone set) 8 to set up a connection with the voice response system 21 of the facilitating unit 2 in a conventional manner. The consumer chooses a certain service, either by using a (telephone) number related to that service, or (in the event of a common number for several services) by entering supplementary numbers on the terminal 8, possibly in reply to questions posed by the voice response system 21. Subsequently the voice response system 21, by way of the network 6, makes a connection with the service unit 7 of the service provider in question.

In this connection, the voice response system 21 may output some (cryptographically protected) identification information in order to mutually identify the voice response system 21 and the service units 7.

The consumer orders his service (or product), whereupon the service unit 7 of the service provider produces a series of DTMF tones which is representative of the service and the costs thereof. Alternatively, the service unit 7 uses another protocol to exchange control information. The voice response system 21 then places the service provider in the waiting mode and gives the consumer instructions with respect to the payment. Substantially at the same time, the voice response system 21 establishes through the communication server 22 a connection with the transaction unit 3. In order to control the switching process in the communication server 22, the voice response system 21 subsequently sends commands (control messages) to the server 22 via link 23.

The consumer starts the payment process by pressing a certain key (e.g., "*") on his telephone set (terminal) 8 or on his transfer (interface) device 10. This key that must be pressed may have been communicated to the consumer by the voice response system 21. Another key (e.g., "#") may serve to discontinue the transaction. In the event that the payment process does take place, the subscriber line of the consumer is connected through to the transaction unit 3. The consumer places his payment means 9 (smart card) in the device 10 in question and holds this device 10 against (the handset of) the telephone set 8. Subsequently, he presses a key of the device 10, whereupon the card 9 and (a security module 31 of) the transaction unit 3 proceed to exchange payment information. Such a device 10 is preferably provided with a display screen on which the status of the payment transaction is shown.

After the payment has been effected, the consumer receives an (e.g., acoustic) signal indicating that the transaction is completed and that a new transaction, if any, may be started. To this end, the service provider receives a feedback from the voice response system. The voice response system 21 may invite the consumer, to choose other services with the aid of DTMF tones.

The system 1 of the present invention thus provides a transparent end-to-end path between the smart card (9 in FIG. 1) and a security module ("SM", 31 in FIG. 1) for exchanging payment information. Alternatively, the system 1 provides a (preferably transparent) path between the smart card 9 and the revaluation unit 4 (for increasing the balance of the card 9) or the expansion unit 5 (for providing additional services, such as user identification). The system 1 also provides a (voice) connection between the user's terminal 8 and the service provider's service unit 7.

The structure of the facilitating unit 2 will now be explained in more detail with reference to FIG. 2.

Figure 2:
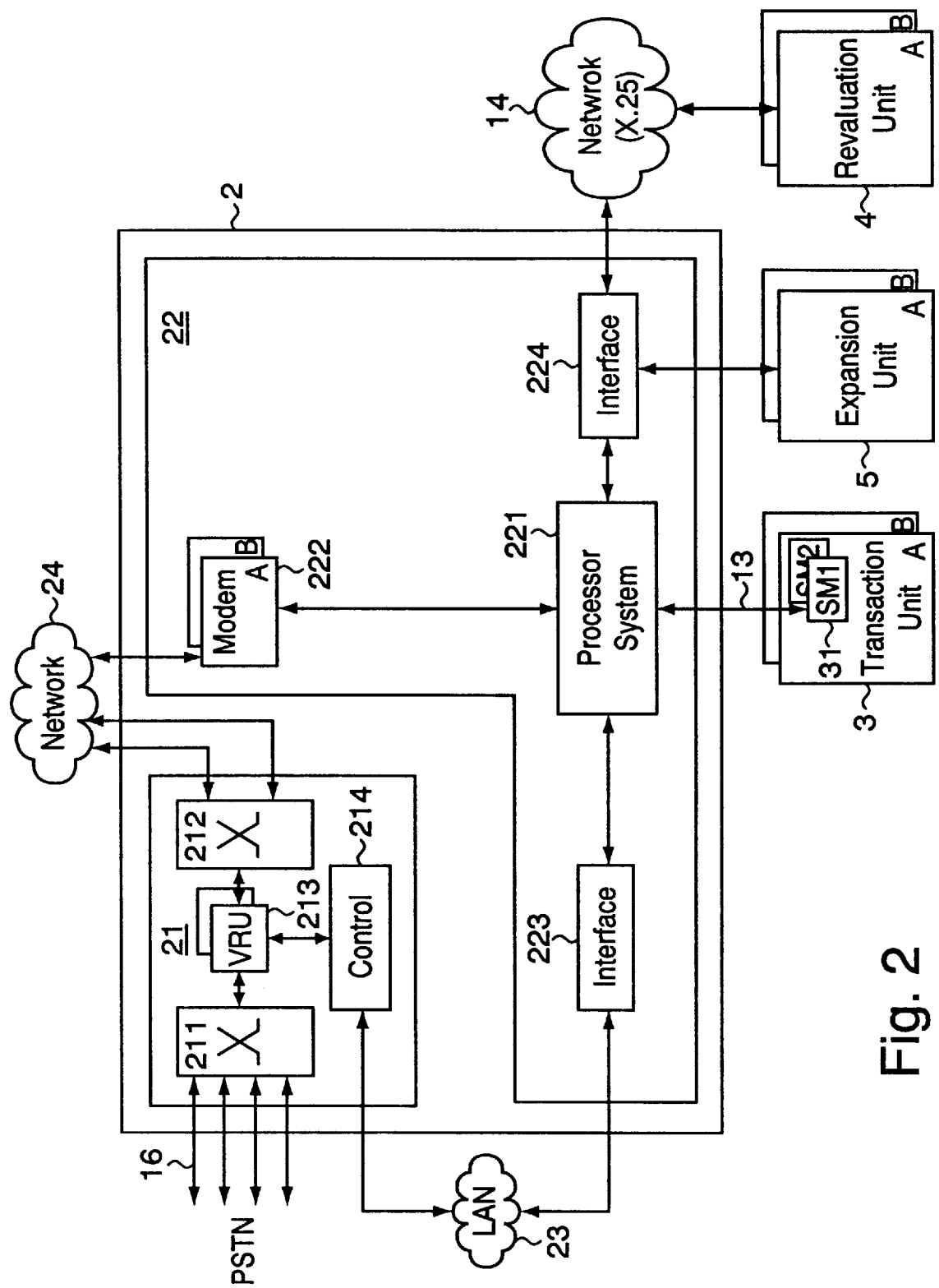

In the embodiment shown in FIG. 2, the voice response system 21 comprises two switches 211 and 212, at least one voice response unit 213 (denoted as "VRU" in FIG. 2) and a control unit 214. The first switch 211 is coupled with a network, e.g. the network 6 of FIG. 1, via a communication link 16. As shown in FIG. 2, the link 16 may consist of a plurality of sub-links, e.g. individual telephone lines. The first switch 211 connects an incoming call with an available voice response unit 213. Preferably, the voice response system 21 comprises a plurality of voice response units 213, e.g. ten or twenty. The second switch 212 is also coupled with the voice response units 213 in order to connect such a unit with the communication server 22 through the data link 24. Data link 24, which is used to exchange data messages (data signals) between the voice response system 21 and the communication server 22, is shown in FIG. 2 as comprising a separate network rather than consisting of a single transmission line. However, a direct connection between the switch 212 and the first interface 222 of the communication server 22 is also possible. It should be noted that the network constituting the data link 24 may be a PSTN network, and that this network may be identical to the network 6 of FIG. 1.

The voice response system 21 of FIG. 2 further comprises a control unit 214, which may comprise a microprocessor system, such as a personal computer. The control unit 214 is connected with the voice response units 213 and with control link 23. The control link 23 is shown in FIG. 2 as comprising a separate network, such as a local area network (LAN), for passing control messages to and from the communication server 22. This enables the voice response system 21 and the communication server 22 to be at different locations, and to interconnect a plurality of voice response systems 21 and a plurality of communication servers 22. However, a direct connection between the control system 214 and the second interface 223 of the communication server 22 is also possible.

It should be noted that alternative embodiments are possible in which the voice response system 21 is much simpler and merely gives an attention signal, after which the system switches to transparant mode and provides a connection with the server 22.

The communication server 22 comprises a processor system 221, a first interface 222 (preferably comprising at least one modem), a second interface 223 and a third interface 224. The processor system 221 may consist of a commercially available microcomputer system having a microprocessor and a memory, using e.g. the UNIX operating system. The processor system 221 interfaces with the control link 23 via the second interface 223. Similarly, the processor system 221 interfaces with the data link 24 via the modems of the first interface 222. As stated before, the data link 24 preferably comprises a telephone network (PSTN), in which case modems are used to convert the data messages into the appropriate formats. However, in case the data link 24 is constituted by a data network, the modems 222 may be replaced by another suitable interface or may possibly be omitted.

In FIG. 2, the communication link 14 comprises a data network, such as a network based on the ITU X.25 recommendation. The third interface 224 provides an appropriate coupling between the processor system 221 and the data network 14. It will be understood that the revaluation unit 4 may comprise an internal interface (not shown).

A transaction unit 3, connected with the processor system 221 via communication link 13, comprises at least one security module 31 (denoted as "SM") for securely storing transaction data. Such security modules are preferably mounted detachably in the transaction unit 3 and are protected against unauthorized access. An example of the use of a security module and of the associated exchange of messages is described in European Patent Application EP 0 637 004 and corresponding U.S. patent application Ser. No. 08/274,838, herewith incorporated by reference in this text.

For the purpose of the authentication of users (consumers) on the basis of payment means 9, the transaction unit 3 is provided with authentication means. To this end, the transaction unit 3 may comprise a data file containing key data, including e.g. master keys and/or diversified keys, and possibly also encryption programs. Although a transaction unit may comprise a separate processor and memory for e.g. performing cryptographic operations and for securely storing data in memory means (e.g. hard discs) associated with the processor, such a unit may in its simplest form be constituted by a card reader/writer in which a security module card is inserted. Such a card is similar to a regular smart card, the integrated circuit being designed for securely storing transaction data.

In FIG. 2, two transactions units 3 labelled A and B are shown by way of example. Similarly, two revaluation units 4 labelled A and B are shown. It will be understood that the number of transaction units 3 and revaluation units 4 which can be connected with the facilitating unit 2 is only limited by the processing power of the processor system 221. If necessary, additional communication servers 22 can be added.

The facilitating unit 2 is thus easily scalable (increasing the number of communication links 16) and expandable (increasing the number of communication servers 22).

The revaluation units 4 are shown in FIGS. 1 and 2 as separate units, but may be integrated in the transaction units 3. A revaluation unit 4 comprises means for increasing the balance of a smart card. Such means for increasing a balance may comprise a processor system (e.g. a PC) running suitable software. During the revaluation, the revaluation unit 4 exchanges data by way of the facilitating unit 2, the communication network 6, the terminal 8 and the interface device 10, with the payment means 9, preferably by means of a security protocol.

The operation of the facilitating unit 2 will further be explained with reference to FIG. 3.

Figure 3:
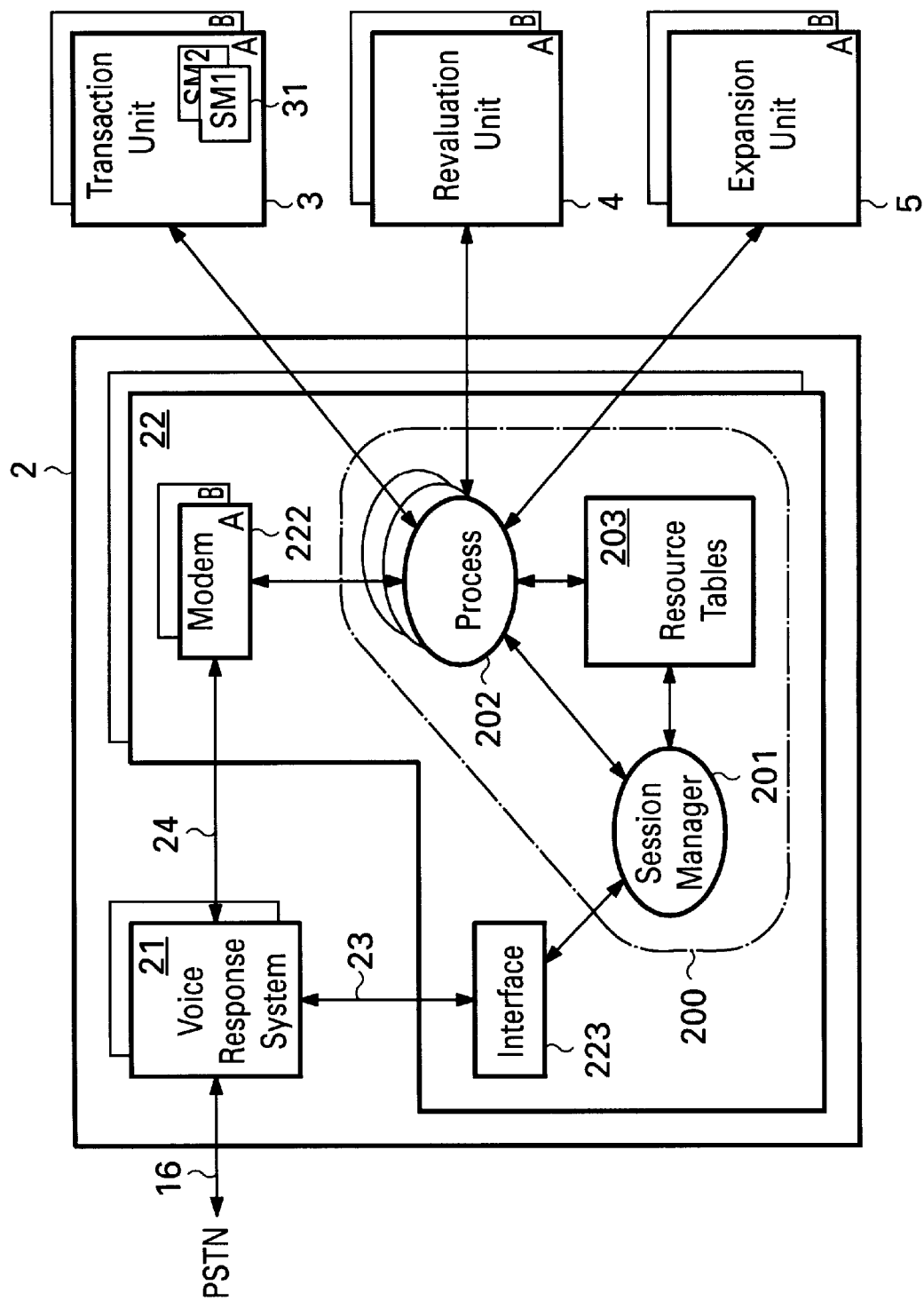

FIG. 3 schematically shows the functionalities of the communication server 22. The main process 200 running in the processor system 221 of FIG. 2 comprises three parts: a session manager 201, processes 202 and resource tables 203. The session manager 201 exchanges control information with the voice response system 21 via the second interface 223. In response to an appropriate request, the session manager 201 checks the resource tables 203 in order to determine whether a new process can be initiated. If this is possible, a new process 202 is created. This is indicated in the resource tables 203, as will later be explained with reference to FIG. 4.

Each process 202 exchanges data with the voice response system 21 via a modem 222. A modem 222 may be assigned to a certain process by means of the resource tables 203. Depending on the particular transaction requested by the consumer, a process 202 interacts with, e.g., the revaluation unit 4 or the transaction unit 3.

As will be understood from the above, the facilitating unit 2 operates in two phases: a control phase and a data phase. In the control phase, a connection is set up, while in the data phase, a (transparent) message exchange takes place.

Figure 4:
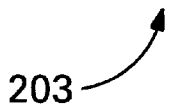

FIG. 4 shows an exemplary embodiment of a resource table 203. The table comprises several columns, a first column being labelled "Type". In this column, the type of a resource is indicated, e.g. processes, transaction units, revaluation units, expansion units, modems, etc. The number of types may be increased as needs arise. Each type comprises a group of items, each item having a reference number.

The second column of table 203 is labelled "Item" and provides a list of the resources of each type. In the case of transaction units, a further subdivision is made as each transaction unit may comprise more than one security module (SM).

The last column of the table 203 indicates whether the resource is available ("F"="free") or not ("U"="used"). The resource table, and in particular its last column, is regularly updated by the session manager, e.g. each time a new process 202 is started and terminated. The session manager 201 scans the resource table before starting a new process 202 in order to determine whether the resources necessary can be allocated to the new process.

In the example shown, the shaded areas indicate that devaluation process # 5, transaction unit B, security module # 2 (of transaction unit B) and modem B are claimed for a devaluation process (some other resources may be claimed for other processes). The devaluation process claiming said resources is a process 202 as depicted in FIG. 3. The process is initiated by the session manager 201 in response to a service request from the voice response system 21. When the devaluation process 202 in question is terminated, the resources claimed are returned to the pool of available resources. This will be indicated in table 203 by setting the corresponding entries in the last column to "F" (free).

Figure 5:
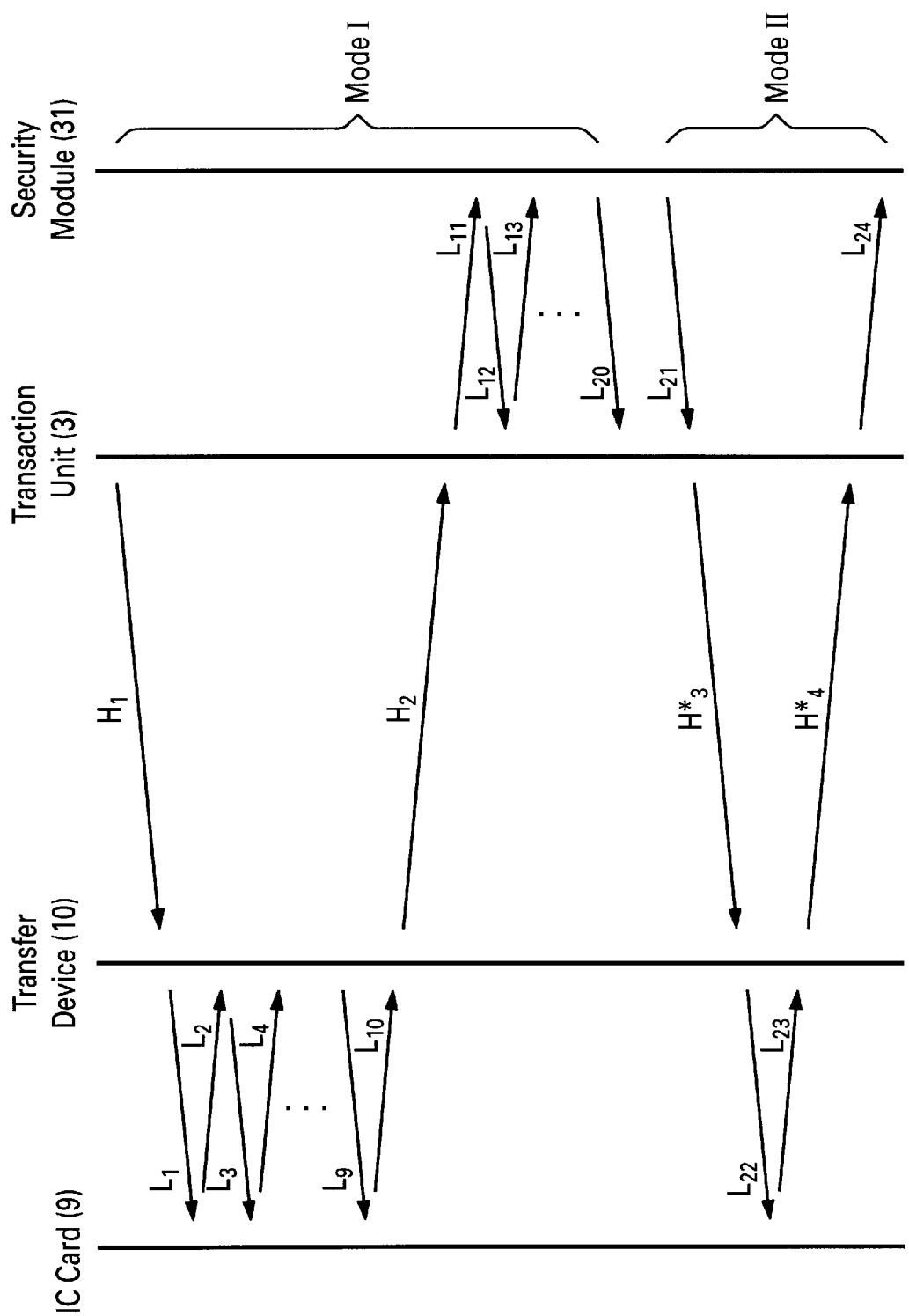

In FIG. 5, the exchange of card data (commands and data sent to the IC card and their responses) between an IC card on the one hand and a security module of a transaction unit on the other hand is schematically represented. The IC card may correspond with the card 9 of FIG. 1, the transfer device may correspond with the interface device 10 of FIG. 1, the transaction unit may be the unit 3 of FIG. 1, and the security module may correspond with the Security Module (SM) 31 in FIG. 1.

In accordance with a further aspect of the present invention, a distinction is made between two levels of card commands exchange. Between the IC card and the transfer device, a low level exchange takes place: the actual card commands and card data are sent to and received from the card. As this exchange is performed using electrical signals within the transfer device 10, the exchange can have a high data rate. Between the transfer device and the transaction unit, however, an acoustic path is present (between the device 10 and the handset of the terminal 8). This section of the connection between IC card and security module usually has a limited transmission speed. For this reason, in this section a high level exchange takes place in which several low level commands are grouped together and are replaced with a single high level command. In this way, the transmission time required for a transaction can be significantly reduced. However, the content of the information transferred is not changed. This will further be explained with reference to FIG. 5.

As is shown in FIG. 5, the transaction unit 3 may issue a high level command (indicated by H). In response to the receipt of this single high level command, the transfer device exchanges several low level commands (indicated by L) with the IC card 9. The result of this exchange is sent by the transfer device to the transaction unit as a single high level command (H). Subsequently, this high level command results in the exchange of several low level commands (L) between the transaction unit and the security module. Each high level command (H) thus represents a routine comprising a plurality (e.g. five of ten) low level commands (L). Preferably, the high level commands are optimized for efficiency by e.g. having each commonly used routine represented by a single high level command.

Preferably, the transfer device supports two different modes of data exchange. In a first mode (indicated by Mode I in FIG. 5) the transfer device operates as described above: a high level command represents several low level commands. In a second mode (indicated by Mode II in FIG. 5) a single low level command (L) is sent as a high level command (H*) to the transfer device, which passes the command as a low level command to the IC card. The resulting low level command (L) produced by the card is again sent by the transfer device to the transaction unit as a high level command (H*), which subsequently converts the command back into a low level command (L). It will be understood that the high level commands H* merely convey low level commands (L). That is, the high level commands H* may e.g. consist of a low level command plus an appropriate header. In this way, low level commands may be transparently passed to the IC card while using the structure and/or data protocol of the high level commands. This transparent passing has the advantage that low level commands may be used for which no high level command is available, i.e. which cannot be grouped in an existing high level command. This is especially advantageous as the introduction of an IC card with one or more new commands does not necessitate an upgrade of the software of the transfer device.

Preferably, the transfer device, as well as the transaction unit, is capable of shifting back and forth between Mode I and Mode II, so that high level commands (H) representing a number of low level commands may be interspersed with high level commands (H*) merely conveying a single low level command All high level messages are passed directly to an application, e.g., the revalue and devalue processes shown in FIG. 3. The system of the present invention thus provides a high degree of transparency with respect to the messages exchanged between the smart card 9 and the applications.

The message exchange of FIG. 5 will now be explained in greater detail, using a devaluation of the smart card (i.e. a payment) as an example.

The transaction unit 3, which handles card devaluations, issues a high level command $H_1$=DEVALU(2.00, R), where 2.00 is the amount which is to be deducted from the card and R is a random number which serves to securely identify the transaction and thus to prevent fraudulent replay. This high level command $H_1$, which itself may have a length of only several bytes, causes the transfer device 10 to exchange a series of low level messages $L_1$–$L_{10}$ with the card 9. Such messages are e.g.:

| | |
|---|---|
| $L_1$: select purse | (<-) |
| $L_2$: done | (->) |
| $L_3$: select application | (<-) |
| $L_4$: done | (->) |
| $L_5$: present value (2.00) | (<-) |
| $L_6$: done | (->) |
| $L_7$: present random (R) | (<-) |
| $L_8$: done | (->) |
| $L_9$: calculate response | (<-) |
| $L_{10}$: response = W | (->) |

The arrows indicate the direction of a message: from the transfer device to the card (←) and from the card to the transfer device (→). W is the value of the calculated response. As can be seen, the actual data (2.00 and R) of the high level command $H_1$ are not altered by the low level commands $L_5$ and $L_7$.

After receiving the response W in low level message $L_{10}$, the transfer device sends a high level message $H_2$=RESPON(W) to the transaction unit. The actual value of W is not altered by the transfer device.

After receiving the high level response message $H_2$, the transaction unit starts an exchange of low level messages $L_{10}$–$L_{20}$ with the security module:

| | |
|---|---|
| $L_{11}$: select SM revalue | (->) |
| $L_{12}$: OK | (<-) |
| $L_{13}$: present value (2.00) | (->) |
| $L_{14}$: OK | (<-) |
| $L_{15}$: present random (R) | (->) |
| $L_{16}$: OK | (<-) |
| $L_{17}$: present response (W) | (->) |
| $L_{18}$: OK | (<-) |
| $L_{19}$: calculate X?? | (->) |
| $L_{20}$: OK | (<-) |

The arrows indicate the direction of a message: from the transaction unit to the security module (→) and from the security module to the transaction unit (←).

As stated above, the actual content of the messages (the value, the random R and the response W) is transparently transferred, while the length of the messages exchanged between the transaction unit and the transfer device is significantly reduced.

The use of mixed low level and high level commands will now be explained, still referring to FIG. 5. For the sake of the example, it will be assumed that the syntax of the instruction "calculate response" is changed in a new release of the smart card. In the example given above, the low level message $L_9$ will consequently produce an error message $L_{10}$: "unknown instruction". This message $L_{10}$ will then be transparently passed to the transaction unit, which may, in return, produce an appropriate instruction and send this command to the transfer device as high level command $H^*_3$. The transfer device subsequently transfers the command $H^*_3$ as low level command $L_{22}$ to the card, which then produces the proper response W. The response W is then sent to the security module as commands $L_{23}$, $H^*_4$ and $L_{24}$.

In this way, only a single low level command is necessary to remedy the use of an incorrect (e.g. outdated) command. Still, a significant saving in the amount of commands transferred over the network (6 in FIG. 1) is maintained, and thus a significant saving in transmission time is achieved.

Although the system 1 of FIGS. 1–3 is preferably applied in combination with smart cards having a prepaid balance (so-called "prepaid cards"), which balance is reduced during a payment, the system may also be applied with payment means which serve exclusively for identification, and in which payments are debited to an account. Such payment means may also be constituted by so-called magnetic stripe cards. Furthermore, the system of the invention is not substantially changed if magnetic stripe cards are used instead of smart cards, e.g. as prepaid cards storing balances.

It will thus be understood by those skilled in the art that the invention is not limited to the embodiments shown, and that many modifications and additions are possible without departing from the scope of the invention.

We claim:

1. Apparatus comprising:
    a facilitating unit for enabling services by providing communication routes among a user terminal, a service unit and a support unit, the facilitating unit comprising:
        a voice response system;
        a communication server connected to the voice response system by both a control link and a data link, the voice response system being configured for receiving a service request and passing the service request to the communication server via the control link; and
        the communication server being configured for establishing, in response to the service request, a communication route from the voice response system, via the data link and the communication server, to the support unit; and
    the support unit comprising a security module for receiving payments from a debit card associated with the user terminal, wherein the support unit is coupled to the communication server through a communication link and the facilitating unit is connected, via a communication network, to both the terminal and the service unit.

2. The apparatus recited in claim 1 wherein the facilitating unit further comprises a plurality of said voice response systems.

3. The apparatus recited in claim 1 wherein the facilitating unit further comprises a plurality of said communication servers.

4. The apparatus recited in claim 1 wherein the voice response system further comprises:
    at least one voice response unit;
    a first switch for routing an incoming call to the one voice response unit;
    a second switch for routing the incoming call from the one voice response unit to the communication server; and
    a control unit for controlling the one voice response unit and for passing control signals to the communication server.

5. The apparatus recited in claim 1 wherein the communication server further comprises:
    a processor system; and
    first and second interfaces for exchanging data signals and control signals, respectively, with the voice response system.

6. The apparatus recited in claim 5 wherein the first interface comprises at least one modem.

7. The apparatus recited in claim 5 wherein the communication server further comprises a third interface for exchanging data signals with the support unit via a data network.

8. The apparatus recited in claim 5 wherein the processor system is configured for providing a session manager which starts new processes, the new processes providing communication routes in response to information stored in a resource table.

9. The apparatus recited in claim 8 wherein the resource table comprises a list of available processes, support units and interfaces.

10. The apparatus recited in claim 9 wherein the resource table is an expandable resource table allowing resources to be added without changing the session manager.

11. A system for providing electronic financial services comprising:
    a communication network;
    a support unit;
    a payment device;
    a terminal coupled to both the communication network and the payment device, the terminal comprising an interface device that exchanges information with said payment device;
    a service unit coupled to the communication network; and
    a facilitating unit coupled to both the communication network and the support unit, wherein the facilitating unit comprises a voice response system and a communication server, the voice response system being connected to the communication server by both a control link and a data link, the voice response system being arranged for receiving a service request and transferring, via the control link, the request to the communication server, the communication server being arranged for establishing, in response to the service request, a communication route from the voice response system, via the data link and the communication server, to the support unit;
    wherein:
        the support unit comprises a security module for receiving payment from a debit card as the payment device and associated with the user terminal;
        the support unit is coupled to the communication server through the communication link; and
        the facilitating unit is capable of being connected, via the communication network, to both the terminal and the service unit.

12. The system recited in claim 11 wherein the support unit has a transaction unit comprising at least one security module for storing transaction data.

13. The system recited in claim 11 wherein the support unit has a revaluation unit for revaluing smart cards.

14. The system recited in claim 13 further comprising a data network for exchanging transaction data between the facilitating unit and the revaluation unit.

15. The system recited in claim 13 wherein the interface device is arranged for communicating with the support unit on a first level and with the payment device on a second level, the first and second levels communicating at different data rates.

16. The system recited in claim 15 wherein a command occurring at the first level comprises a single command occurring at the second level.

17. The system recited in claim 15 wherein a command occurring at the first level represents more than one command occurring at the second level.

18. The system recited in claim 11 wherein the communication network comprises a fixed public switched telephone network.

19. The system recited in claim 11 wherein the communication network comprises a mobile public telephone network.

20. A method for providing communication routes among a user terminal, a service unit and a support unit and for enabling a financial transaction to occur between the user terminal and the support unit, the method comprising the steps of:

receiving a service request and passing, via a control link, the service request to a communication server;

establishing, in response to the service request, a communication route from a voice response system, via a data link and the communication server, to the support unit; and receiving a payment from a debit card associated with the user terminal at a security module associated with said support unit, the support unit being coupled to the communication server through a communication line.

* * * * *